US011040653B2

(12) United States Patent
Ricart et al.

(10) Patent No.: US 11,040,653 B2
(45) Date of Patent: Jun. 22, 2021

(54) TRACK ASSEMBLY

(71) Applicant: Lear Corporation, Southfield, MI (US)

(72) Inventors: Raúl Ricart, Valls (ES); Antoni Ferré Fàbregas, Tarragona (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/284,524

(22) Filed: Feb. 25, 2019

(65) Prior Publication Data

US 2020/0269754 A1   Aug. 27, 2020

(51) Int. Cl.
| F16M 13/00 | (2006.01) |
| B60Q 3/233 | (2017.01) |
| B60N 2/02 | (2006.01) |
| B60N 2/07 | (2006.01) |
| B60Q 3/66 | (2017.01) |
| B60Q 3/80 | (2017.01) |
| B60Q 3/78 | (2017.01) |

(52) U.S. Cl.
CPC .......... *B60Q 3/233* (2017.02); *B60N 2/0244* (2013.01); *B60N 2/0722* (2013.01); *B60Q 3/66* (2017.02); *B60Q 3/78* (2017.02); *B60Q 3/80* (2017.02); *B60N 2002/0272* (2013.01); *B60Q 2500/00* (2013.01); *B60Q 2900/00* (2013.01)

(58) Field of Classification Search
CPC ............. B60N 2/30; B60Q 3/233; B60Q 3/68
See application file for complete search history.

(56) References Cited

U.S. PATENT DOCUMENTS

| 2,126,143 A | 8/1938 | McGregor |
| 2,263,554 A | 11/1941 | Brach |
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |

(Continued)

FOREIGN PATENT DOCUMENTS

| CN | 203190203 U | 9/2013 |
| CN | 203799201 U | 8/2014 |

(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Amy J. Sterling
(74) *Attorney, Agent, or Firm* — Fishman Stewart PLLC (57) ABSTRACT

A track assembly includes a track, a transmitter unit, a support member, and a receiver unit. The transmitter unit may be connected to the track, and/or the support member may be configured for connection with the track. The receiver unit may be connected to the support member and/or may be configured to receive light from the transmitter unit. The track assembly may include a first electronic control unit that may be connected to the transmitter unit. The first electronic control unit may be configured to control the transmitter unit. The transmitter unit may include a light source, and/or the transmitter unit may be configured to transmit light from the light source into the track. The transmitter unit may be configured to transmit visible light and/or non-visible light. The track assembly may include a second electronic control unit.

20 Claims, 10 Drawing Sheets

(56) References Cited

U.S. PATENT DOCUMENTS

| | | | |
|---|---|---|---|
| 3,268,848 | A | 8/1966 | Adams |
| 3,940,182 | A | 2/1976 | Tamura |
| 4,020,769 | A | 5/1977 | Keir |
| 4,198,025 | A | 4/1980 | Lowe et al. |
| 4,243,248 | A | 1/1981 | Scholz et al. |
| 4,282,631 | A | 8/1981 | Uehara et al. |
| 4,511,187 | A | 4/1985 | Rees |
| 4,575,295 | A | 3/1986 | Rebentisch |
| 4,618,808 | A | 10/1986 | Ish-Shalom et al. |
| 4,707,030 | A | 11/1987 | Harding |
| 4,711,589 | A | 12/1987 | Goodbred |
| 4,763,360 | A | 8/1988 | Daniels et al. |
| 4,776,809 | A | 10/1988 | Hall |
| 4,830,531 | A | 5/1989 | Condit et al. |
| 4,853,555 | A | 8/1989 | Wheat |
| 4,961,559 | A | 10/1990 | Raymor |
| 4,969,621 | A | 11/1990 | Munchow et al. |
| 4,987,316 | A | 1/1991 | White et al. |
| 5,137,331 | A | 8/1992 | Colozza |
| 5,167,393 | A | 12/1992 | Hayakawa et al. |
| 5,192,045 | A | 3/1993 | Yamada et al. |
| 5,222,814 | A | 6/1993 | Boelryk |
| 5,322,982 | A | 6/1994 | Leger et al. |
| 5,332,290 | A | 7/1994 | Borlinghaus et al. |
| 5,348,373 | A | 9/1994 | Stiennon |
| 5,362,241 | A | 11/1994 | Matsuoka et al. |
| 5,446,442 | A | 8/1995 | Swart et al. |
| 5,466,892 | A | 11/1995 | Howard et al. |
| 5,489,173 | A | 2/1996 | Hofle |
| 5,582,381 | A | 12/1996 | Graf et al. |
| 5,599,086 | A | 2/1997 | Dutta |
| 5,618,192 | A | 4/1997 | Drury |
| 5,655,816 | A | 8/1997 | Magnuson et al. |
| 5,676,341 | A | 10/1997 | Tarusawa et al. |
| 5,696,409 | A | 12/1997 | Handman et al. |
| 5,701,037 | A | 12/1997 | Weber et al. |
| 5,796,177 | A | 8/1998 | Werbelow et al. |
| 5,800,015 | A | 9/1998 | Tsuchiya et al. |
| 5,899,532 | A | 5/1999 | Paisley et al. |
| 5,918,847 | A | 7/1999 | Couasnon |
| 5,921,606 | A | 7/1999 | Moradell et al. |
| 5,964,442 | A | 10/1999 | Wingblad et al. |
| 5,964,815 | A | 10/1999 | Wallace et al. |
| 6,036,157 | A | 3/2000 | Baroin et al. |
| 6,142,718 | A | 11/2000 | Kroll |
| 6,150,774 | A | 11/2000 | Mueller et al. |
| 6,166,451 | A | 12/2000 | Pigott |
| 6,216,995 | B1 | 4/2001 | Koester |
| 6,227,595 | B1 | 5/2001 | Hamelin et al. |
| 6,290,516 | B1 | 9/2001 | Gerber |
| 6,296,498 | B1 | 10/2001 | Ross |
| 6,299,230 | B1 | 10/2001 | Oettl |
| 6,318,802 | B1 | 11/2001 | Sjostrom et al. |
| 6,357,814 | B1 | 3/2002 | Boisset et al. |
| 6,400,259 | B1 | 6/2002 | Bourcart et al. |
| 6,405,988 | B1 | 6/2002 | Taylor et al. |
| 6,422,596 | B1 | 7/2002 | Fendt et al. |
| 6,439,531 | B1 | 8/2002 | Severini et al. |
| 6,480,144 | B1 | 11/2002 | Miller et al. |
| 6,536,928 | B1 | 3/2003 | Hein et al. |
| 6,693,368 | B2 | 2/2004 | Schumann et al. |
| 6,710,470 | B2 | 3/2004 | Bauer et al. |
| 6,719,350 | B2 | 4/2004 | Duchateau et al. |
| 6,736,458 | B2 | 5/2004 | Chabanne et al. |
| 6,772,056 | B2 | 8/2004 | Mattes et al. |
| 6,805,375 | B2 | 10/2004 | Enders et al. |
| 6,851,708 | B2 | 2/2005 | Kazmierczak |
| 6,882,162 | B2 | 4/2005 | Schirmer et al. |
| 6,960,993 | B2 | 11/2005 | Mattes et al. |
| 7,042,342 | B2 | 5/2006 | Luo et al. |
| 7,083,437 | B2 | 8/2006 | Mackness |
| 7,086,874 | B2 | 8/2006 | Mitchell et al. |
| 7,113,541 | B1 | 9/2006 | Lys et al. |
| 7,159,899 | B2 | 1/2007 | Nitschke et al. |
| 7,170,192 | B2 | 1/2007 | Kazmierczak |
| 7,188,805 | B2 | 3/2007 | Henley et al. |
| 7,207,541 | B2 | 4/2007 | Frohnhaus et al. |
| 7,271,501 | B2 | 9/2007 | Dukart et al. |
| 7,288,009 | B2 | 10/2007 | Lawrence et al. |
| 7,293,831 | B2 | 11/2007 | Greene |
| 7,300,091 | B2 | 11/2007 | Nihonmatsu et al. |
| 7,322,605 | B2 | 1/2008 | Ventura et al. |
| 7,348,687 | B2 | 3/2008 | Aichriedler et al. |
| 7,363,194 | B2 | 4/2008 | Schlick et al. |
| 7,370,831 | B2 | 5/2008 | Laib et al. |
| 7,388,466 | B2 | 6/2008 | Ghabra et al. |
| 7,389,960 | B2 | 6/2008 | Mitchell et al. |
| 7,416,042 | B2 | 8/2008 | Czaykowska et al. |
| 7,434,883 | B2 | 10/2008 | Deptolla |
| 7,454,170 | B2 | 11/2008 | Goossens et al. |
| 7,455,535 | B2 | 11/2008 | Insalaco et al. |
| 7,503,522 | B2 | 3/2009 | Henley et al. |
| 7,505,754 | B2 | 3/2009 | Kazmierczak et al. |
| 7,523,913 | B2 | 4/2009 | Mizuno et al. |
| 7,556,233 | B2 | 7/2009 | Gryp et al. |
| 7,560,827 | B2 | 7/2009 | Jacas-Miret et al. |
| 7,633,301 | B2 | 12/2009 | Steenwyk et al. |
| 7,661,637 | B2 | 2/2010 | Mejuhas et al. |
| 7,665,939 | B1 | 2/2010 | Cardona |
| 7,739,820 | B2 | 6/2010 | Frank |
| 7,744,386 | B1 | 6/2010 | Speidel et al. |
| 7,980,525 | B2 | 7/2011 | Kostin |
| 7,980,798 | B1 | 7/2011 | Kuehn et al. |
| 8,010,255 | B2 | 8/2011 | Darraba |
| 8,146,991 | B2 | 4/2012 | Stanz et al. |
| 8,278,840 | B2 | 10/2012 | Logiudice et al. |
| 8,282,326 | B2 | 10/2012 | Krostue et al. |
| 8,376,675 | B2 | 2/2013 | Schulze et al. |
| 8,463,501 | B2 | 6/2013 | Jousse |
| 8,648,613 | B2 | 2/2014 | Ewerhart et al. |
| 8,702,170 | B2 | 4/2014 | Abraham et al. |
| 8,757,720 | B2 | 6/2014 | Hurst, III et al. |
| 8,800,949 | B2 | 8/2014 | Schebaum et al. |
| 8,857,778 | B2 | 10/2014 | Nonomiya |
| 8,936,526 | B2 | 1/2015 | Boutouil et al. |
| 8,967,719 | B2 | 3/2015 | Ngiau et al. |
| RE45,456 | E | 4/2015 | Sinclair et al. |
| 9,010,712 | B2 | 4/2015 | Gray et al. |
| 9,018,869 | B2 | 4/2015 | Yuasa et al. |
| 9,045,061 | B2 | 6/2015 | Kostin et al. |
| 9,162,590 | B2 | 10/2015 | Nagura et al. |
| 9,174,604 | B2 | 11/2015 | Wellhoefer et al. |
| 9,242,580 | B2 | 1/2016 | Schebaum et al. |
| 9,318,922 | B2 | 4/2016 | Hall et al. |
| 9,340,125 | B2 | 5/2016 | Stutika et al. |
| 9,346,428 | B2 | 5/2016 | Bortolin |
| 9,422,058 | B2 | 8/2016 | Fischer et al. |
| 9,561,770 | B2 | 2/2017 | Sievers et al. |
| 9,610,862 | B2 | 4/2017 | Bonk et al. |
| 9,663,232 | B1 | 5/2017 | Porter et al. |
| 9,673,583 | B2 | 6/2017 | Hudson et al. |
| 9,701,217 | B2 | 7/2017 | Eckenroth et al. |
| 9,731,628 | B2 | 8/2017 | Rao et al. |
| 9,758,061 | B2 | 9/2017 | Pluta et al. |
| 9,789,834 | B2 | 10/2017 | Rapp et al. |
| 9,796,304 | B2 | 10/2017 | Salter et al. |
| 9,815,425 | B2 | 11/2017 | Rao et al. |
| 9,821,681 | B2 | 11/2017 | Rao et al. |
| 9,840,220 | B2 | 12/2017 | Van Buskirk et al. |
| 9,919,624 | B2 | 3/2018 | Cziomer et al. |
| 9,950,682 | B1 | 4/2018 | Gramenos et al. |
| 10,059,232 | B2 | 8/2018 | Frye et al. |
| 10,160,351 | B2 | 12/2018 | Sugimoto et al. |
| 10,479,227 | B2 | 11/2019 | Nolte et al. |
| 10,493,243 | B1 | 12/2019 | Braham |
| 10,547,135 | B2 | 1/2020 | Sugiura |
| 10,549,659 | B2 | 2/2020 | Sullivan et al. |
| 10,654,378 | B2 | 5/2020 | Pons |
| 2005/0046367 | A1 | 3/2005 | Wevers et al. |
| 2005/0089367 | A1 | 4/2005 | Sempliner |
| 2005/0150705 | A1 | 7/2005 | Vincent et al. |
| 2005/0211835 | A1 | 9/2005 | Henley et al. |
| 2005/0215098 | A1 | 9/2005 | Muramatsu et al. |
| 2005/0230543 | A1 | 10/2005 | Laib et al. |

(56) References Cited

U.S. PATENT DOCUMENTS

| | | |
|---|---|---|
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1* | 10/2009 | Kino ............... B60Q 1/323 362/602 |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1* | 2/2013 | Pattan ............... G06F 21/54 705/14.4 |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1* | 8/2016 | Trier ............... B60Q 1/0035 |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernandez Banares et al. |
| 2020/0282871 A1 | 9/2020 | Ricart et al. |
| 2020/0282880 A1 | 9/2020 | Jones et al. |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

\* cited by examiner

TRACK ASSEMBLY

TECHNICAL FIELD

The present disclosure generally relates to track assemblies including support members and tracks that may be used in connection with vehicles and vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex and/or may not provide sufficient functionality. Some track assemblies may not be configured for transmitting and/or receiving visible light and/or non-visible light.

There is a desire for solutions/options that minimize or eliminate one or more challenges or shortcomings of tack assemblies. The foregoing discussion is intended only to illustrate examples of the present field and should not be taken as a disavowal of scope.

SUMMARY

In embodiments, a track assembly may include a track, a transmitter unit, a support member, and/or a receiver unit. The transmitter unit may be connected to the track, and/or the support member may be configured for connection with the track. The receiver unit may be connected to the support member and/or may be configured to receive light from the transmitter unit. The track assembly may include a first electronic control unit that may be connected to the transmitter unit. A first electronic control unit may be configured to control the transmitter unit. The transmitter unit may include a light source, and/or the transmitter unit may be configured to transmit light from the light source into the track. The transmitter unit may be configured to transmit visible light and/or non-visible light. The track assembly may include a second electronic control unit, and/or the second electronic control unit may be connected to the receiver unit. The first electronic control unit may be configured to transmit information to the second electronic control unit via non-visible light transmitted by the transmitter unit and received by the receiver unit.

With embodiments, the first electronic control unit may be configured to send information via the transmitter unit. The track assembly may include a light guide that may be connected to the track. The light guide may be connected to the transmitter unit and/or may be configured to guide light from the transmitter unit along the track. The light guide may extend the length of the track. The track assembly may include a reflecting element that may be connected to the track, and/or the reflecting element may be configured to reflect light from the transmitter unit. The light guide may be connected to the track. The track may include a bottom side, a second side, and/or a third side. The light guide may be disposed at least partially in the second side. The second side may include a first portion, and/or the third side may include a second portion. The first portion and/or the second portion may extend in a Y-direction from the second side and the third side. The light guide may be disposed in the first portion.

In embodiments, the light guide may be substantially cylindrical and/or may be disposed in a channel in a top surface of the track. The track may include a plurality of apertures that may be connected to the channel. The apertures may be disposed substantially perpendicular to the channel. The track assembly may include a first light guide and/or a second light guide that may be connected to the track. The first light guide may be connected to a ramped portion of the track. The first light guide and the second light guide may be disposed opposite from each other. The transmitter unit may be configured to transmit visible light for aesthetics and/or transmit non-visible light to communicate with the receiver unit. The transmitter unit may be configured to transmit visible light that may provide a status indicator to a user.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
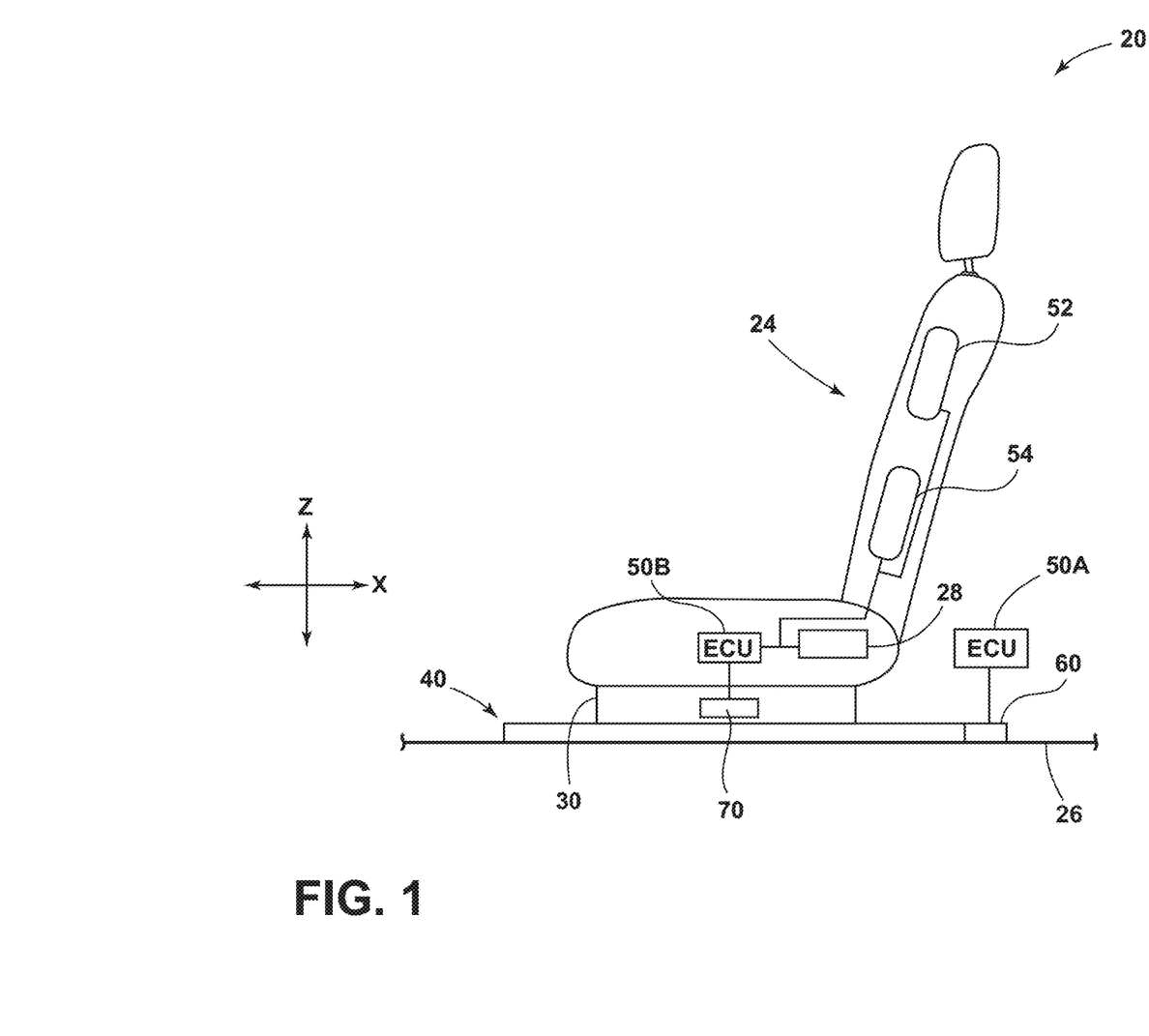
FIG. 1 is a side view generally illustrating an embodiment of a track assembly according to teachings of the present disclosure.

In embodiments, such as generally illustrated in FIG. 1, a track assembly 20 may include a support member 30, a track 40, a first electronic control unit (ECU) 50A, a second ECU 50B, a transmitter unit 60, and/or a receiver unit 70. The track assembly 20 may be configured for selective electrical connection between the support member 30 and the track 40. For example and without limitation, the support member 30 may be configured for selective electrical connection with the track 40. The support member 30 may support and/or be connected to a seat 24 (e.g., vehicle seat), and/or other removable elements. The track 40 may be connected to a mounting surface 26, such as a vehicle floor (e.g., via a fastener 26A).

With embodiments, a support member 30 may be connected to and/or be configured to engage a track 40. The support member 30 and/or the track 40 may extend substantially longitudinally (e.g., in an X-direction). For example and without limitation, the support member 30 may move (e.g., slide, roll, translate, etc.) in a longitudinal direction along the track 40. The support member 30 may selectively engage and/or disengage from the track 40. The support member 30 may be inserted into and/or be removed from the track 40 in a Z-direction (e.g., a vertical direction). The support member 30 may include a cassette configuration.

Figure 3:
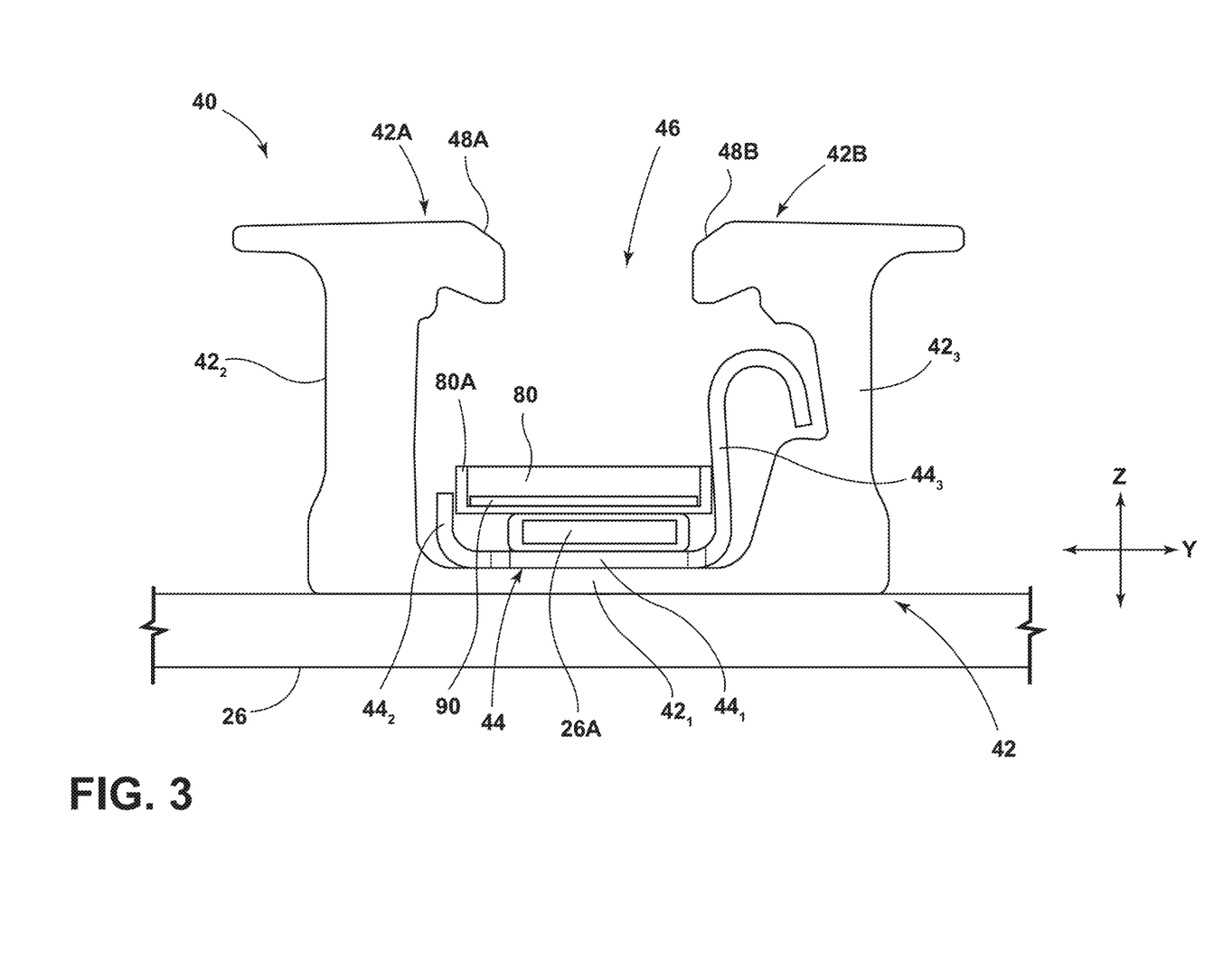
FIG. 3 is a cross-sectional view generally illustrating an embodiment of a track assembly according to teachings of the present disclosure.

In embodiments, such as generally illustrated in FIGS. 1 and 3, a track 40 may include first/outer track 42 and/or a second/inner track 44. The first track 42 and/or the second track 44 may extend substantially in a longitudinal direction (e.g., the X-direction). The first track 42 may include a first/bottom wall $42_1$, a second wall $42_2$, and/or a third wall $42_3$. The bottom wall $42_1$, the second wall $42_2$, and/or the third wall $42_3$ may be connected to form a generally U-shaped configuration. The bottom wall $42_1$ may, for example, be substantially planar. The second wall $42_2$ and/or the third wall $42_3$ may extend perpendicularly (e.g., vertically) from opposite sides of the bottom wall $42_1$. The second wall $42_2$ may include a first portion 42A, and/or the third wall $42_3$ may include a second portion 42B. The first portion 42A and/or the second portion 42B may project laterally (e.g., in a Y-direction) toward a center of the track 40. The first portion 42A and/or the second portion 42B may be substantially planar. In embodiments, the first portion 42A and the second portion 42B may be disposed such that a gap 46 may be provided between the first portion 42A and the second portion 42B (e.g., the first portion 42A and the second portion 42B may be offset in the Y-direction). The gap 46 may extend longitudinally along the track 40, and/or the gap 46 may be centered along the track 40.

With embodiments, the second track 44 may be disposed at least partially in the first track 42. For example and without limitation, the second track 44 may be substantially U-shaped. The second track 44 may include a first/bottom wall $44_1$, a second wall $44_2$, and/or a third wall $44_3$. The second wall $44_2$ may be shorter than the third wall $44_3$. The second wall $44_2$ and/or the third wall $44_3$ may be partially bent and/or curved. The second wall $44_2$ and the third wall $44_3$ may extend perpendicularly (e.g., vertically) from the bottom wall $44_1$. The bottom wall $44_1$ of the second track 44 may be generally aligned with and/or adjacent to the bottom wall $42_1$ of the first track 42. The second wall $44_2$ of the second track 44 may be generally aligned with and/or adjacent to the second wall $42_2$ of the first track 42. The third wall $44_3$ of the second track 44 may be generally aligned with and/or adjacent to the third wall $42_3$ of the first track 42.

In embodiments, such as generally shown in FIG. 1, the track assembly 20 may include a first ECU 50A and a second ECU 50B. The first ECU 50A may be connected to one or more systems of a vehicle (e.g., powertrain, suspension, etc.). The second ECU 50B may be connected to the support member 30 (and/or the seat 24) and/or may be connected to one or more of a variety of seat systems 28 (e.g., electronic components, safety systems, etc.). For example and without limitation, the second ECU 50B may be connected to a first safety device 52 and/or a second safety device 54, and/or the second ECU 50B may be configured to activate the first safety device 52 and/or second safety device 54 upon receiving information from the first ECU 50A.

Figure 2:
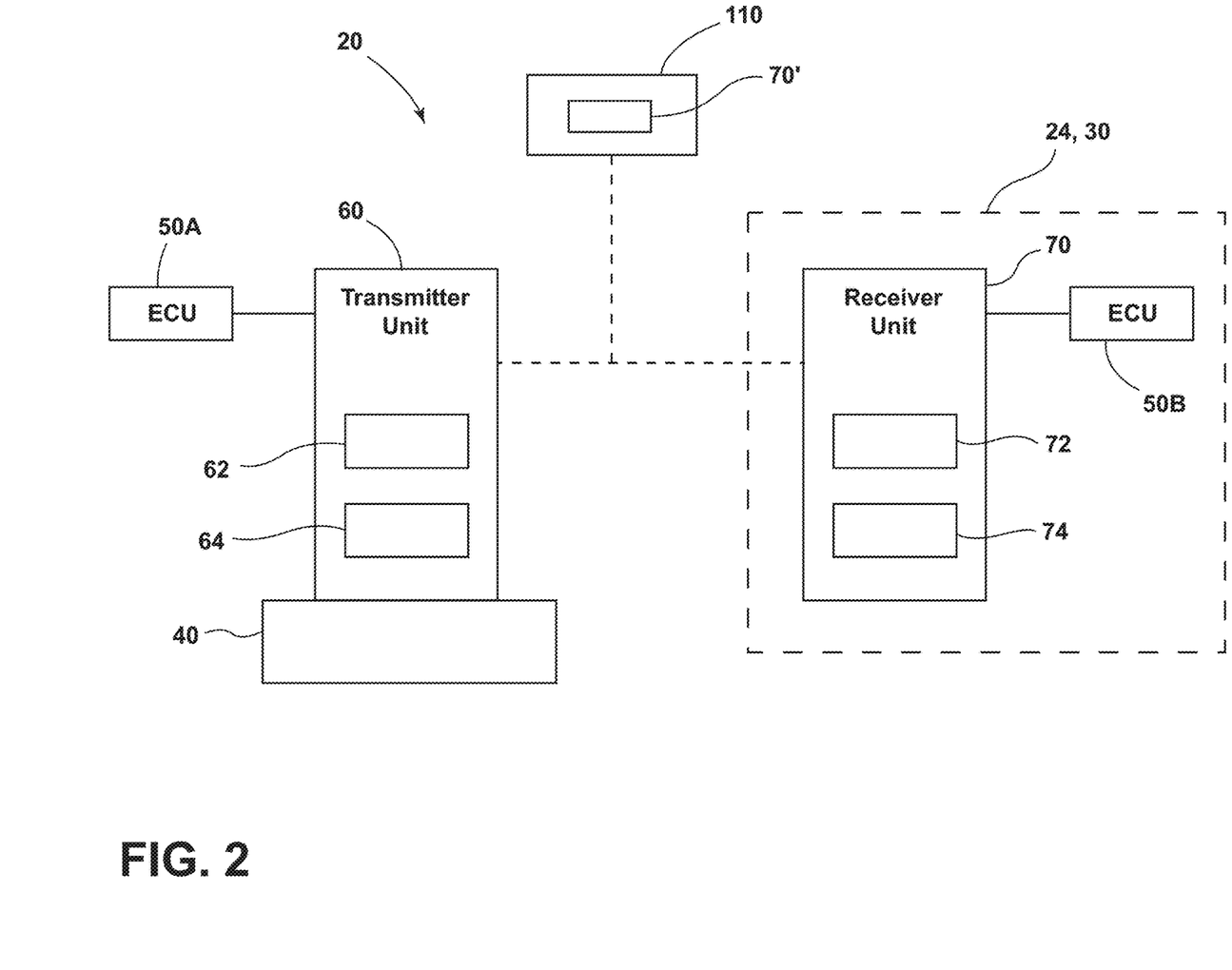
FIG. 2 is a schematic view generally illustrating an embodiment of a track assembly according to teachings of the present disclosure.

With embodiments, such as generally illustrated in FIG. 2, the track assembly 20 may include a transmitter unit 60. The transmitter unit 60 may be connected to the first ECU 50A. The first ECU 50A may be configured to activate/control the transmitter unit 60. The support member 30 and/or the seat 24 may include a receiver unit 70. The receiver unit 70 may be connected to the second ECU 50B. The second ECU 50B may be configured to receive information from the receiver unit 70. The receiver unit 70 may include a first sensor 72 for receiving/sensing visible, and/or a second sensor 74 for receiving/sensing non-visible light (e.g., an IR photodetector). The transmitter unit 60 may be configured to communicate with the receiver unit 70. For example without limitation, the transmitter unit 60 may be configured to communicate a variety of information to the receiver unit 70 such as, safety device trigger information, desired seat position information, current seat position information (e.g., of other seats), and/or other vehicle information.

With embodiments, the transmitter unit 60 may be configured to transmit visible light and/or non-visible light. For example and without limitation, the transmitter unit 60 may include a visible light source 62 and/or a non-visible light source 64. The first ECU 50A may be configured to selectively activate the visible light source 62 and/or the non-visible light source 64. The transmitter unit 60 may be disposed at an end of the first track 42 and/or the second track 44. The transmitter unit 60 may include the visible light source 62 and/or non-visible light source 64 disposed at both ends of the first track 42 and/or the second track 44. The transmitter unit 60 may be configured to control various functions of the vehicle seat 24 (e.g., activating the safety devices 52, 54), such as via the second ECU 50B, regardless of electromagnetic interference in or around the track assembly 20. The transmitter unit 60 and/or the receiver unit 70 may serve as a redundant communication function for safety purposes and/or diagnostics (e.g., in addition to one or more other communication methods). The visible light source 62 and/or the non-visible light source 64 may, for example and without limitation, be a light-emitting diode (LED).

In embodiments, the transmitter unit 60 may be configured to transmit non-visible light, such as via a non-visible light source 64. For example and without limitation, the transmitter unit 60 may be configured to transmit near infrared (NIR) light. The transmitter unit 60 may be configured to communicate with the receiver unit 70 and/or the second ECU 50B via non-visible light. The second ECU 50B may be configured to receive information from the transmitter unit 60 via the receiver unit 70. The second ECU 50B may receive information that may be associated with one or more of a variety of seats 24 and/or seat components. For example and without limitation, the second ECU 50B may receive information to activate the first safety device 52 and/or the second safety device 54, and/or to move the vehicle seat 24. The transmitter unit 60 may be configured to transmit non-visible light in the track assembly 20 and/or the receiver unit 70 may be configured to receive the non-visible light within the track assembly 20.

With embodiments, the transmitter unit 60 may be configured to transmit visible light. The transmitter unit 60 may be configured to illuminate the track assembly 20 via the visible light source 62. The visible light source 62 (and/or the non-visible light source 64) may be connected to a light guide 80. The light guide 80 may include one or more of a variety of at least semi-transparent materials. For example the light guide 80 may include a plastic material, a fiber optic material, and/or other materials. Additionally or alternatively, the light guide 80 may include one or more opaque materials that may be disposed at or about a perimeter of the light guide 80, such as to limit the transmission of light to a certain direction or directions (e.g., the light guide 80 may include a frame 80A that may include opaque plastic). The light guide 80 may include one or more materials that may be configured to amplify and/or reflect the light from the visible light source 62. The light guide 80 may be substantially disposed within the first track 42 and/or the second track 44, which may include a material that may reflect light, such as, for example and without limitation, aluminum. The light guide 80 may extend substantially in the X-direction, such as along some or all of the length of the first track 42 and/or the second track 44. The light guide 80 may include a profile that may be one or more of a variety of shapes, sizes, and/or configurations. For example and without limitation, the profile of the light guide 80 may be substantially rectangular, circular, rounded, and/or a combination of shapes. The light guide 80 may, for example and without limitation, include a length in an X-direction of about 2000 mm, which may be about the same as a length of the track 40, a width in the Y-direction of about 26 mm, and/or a height in the Z-direction of about 4 mm or less. The height (or diameter) of the light guide 80 may be determined according to the material(s) of the light guide 80, a number/size of apertures 100 of the track 40 that may provide access to the light guide 80, and/or the type of connection with the transmitter unit 60. The material(s) of the light guide 80 may be configured for guiding light (e.g., visible and non-visible) along some or all of the length of the light guide 80 and/or the track 40. Additionally or alternatively, the material(s) of the light guide 80 may be configured to reflect at least some of the light from the transmitter unit 60 outside of the light guide 80 (e.g., include side-emitting capabilities). The material(s) of the light guide 80 may, for example and without limitation, include polymethyl methacrylate (PMMA) and/or a fiber optic material.

Figure 4:
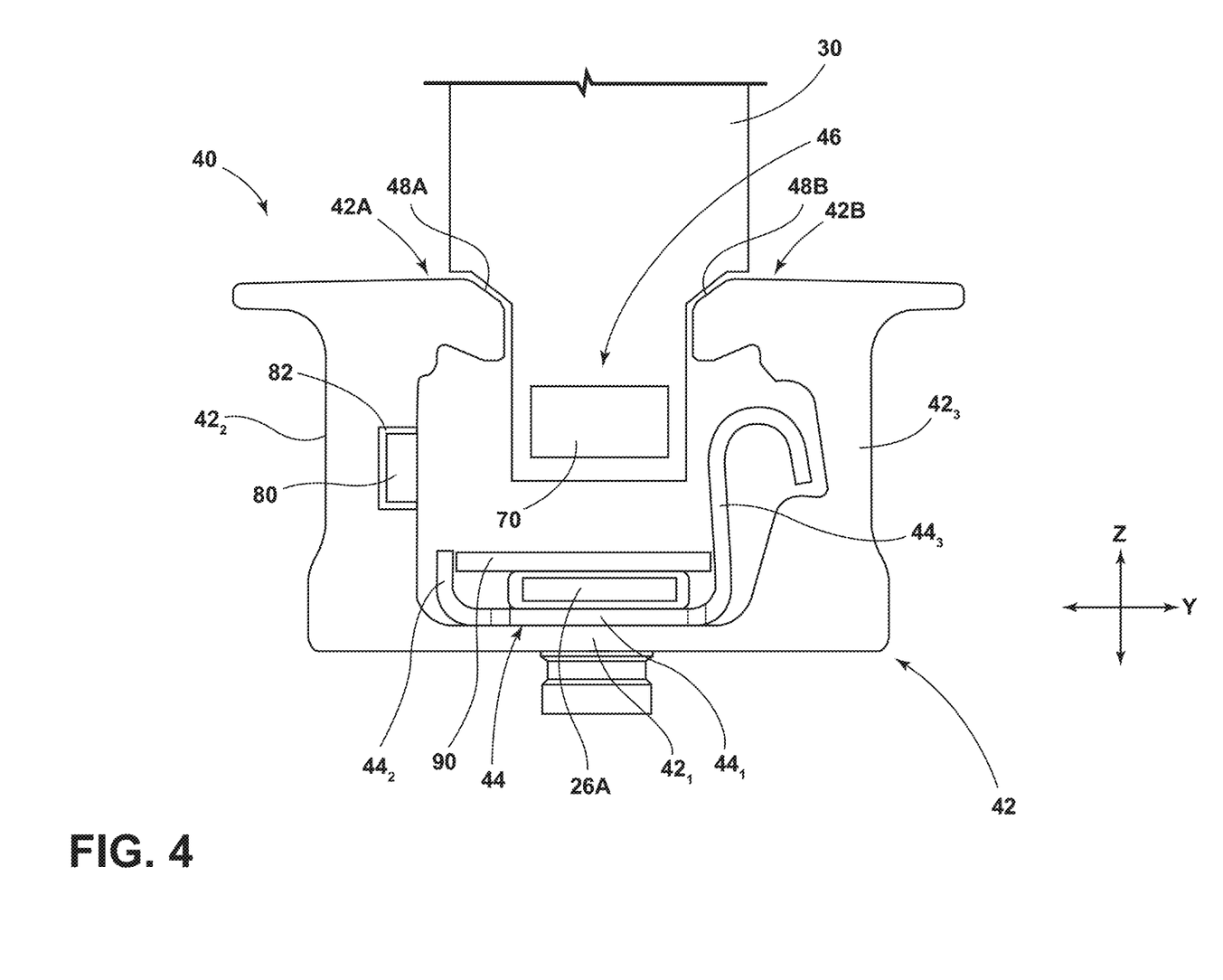
FIG. 4 is a cross-sectional view generally illustrating an embodiment of a track assembly according to teachings of the present disclosure.

In embodiments, such as generally illustrated in FIGS. 3 and 4, the track assembly 20 may include a reflecting element 90. The reflecting element 90 may be configured to amplify and/or reflect visible light transmitted from the visible light source 62. The reflecting element 90 may include one or more of a variety of light reflecting and/or refracting materials. For example and without limitation, a reflecting element 90 may be configured as a mirror. The reflecting element 90 may reflect visible light such that the light guide 80 may substantially illuminate the track assembly 20. The reflecting element 90 may be disposed at one or more of a variety of locations. For example and without limitation, the reflecting element 90 may be disposed at a bottom of the light guide 80 (see, e.g., FIG. 3) and/or may be disposed proximate bottom walls $42_1$, $44_1$ of the tracks 42, 44, such as at a bottom of the light guide 80 (see, e.g., FIG. 4). The reflecting element 90 may be substantially planar and/or may extend substantially in the X-direction, such as along some or all of the length of the light guide 80.

Figure 5A:
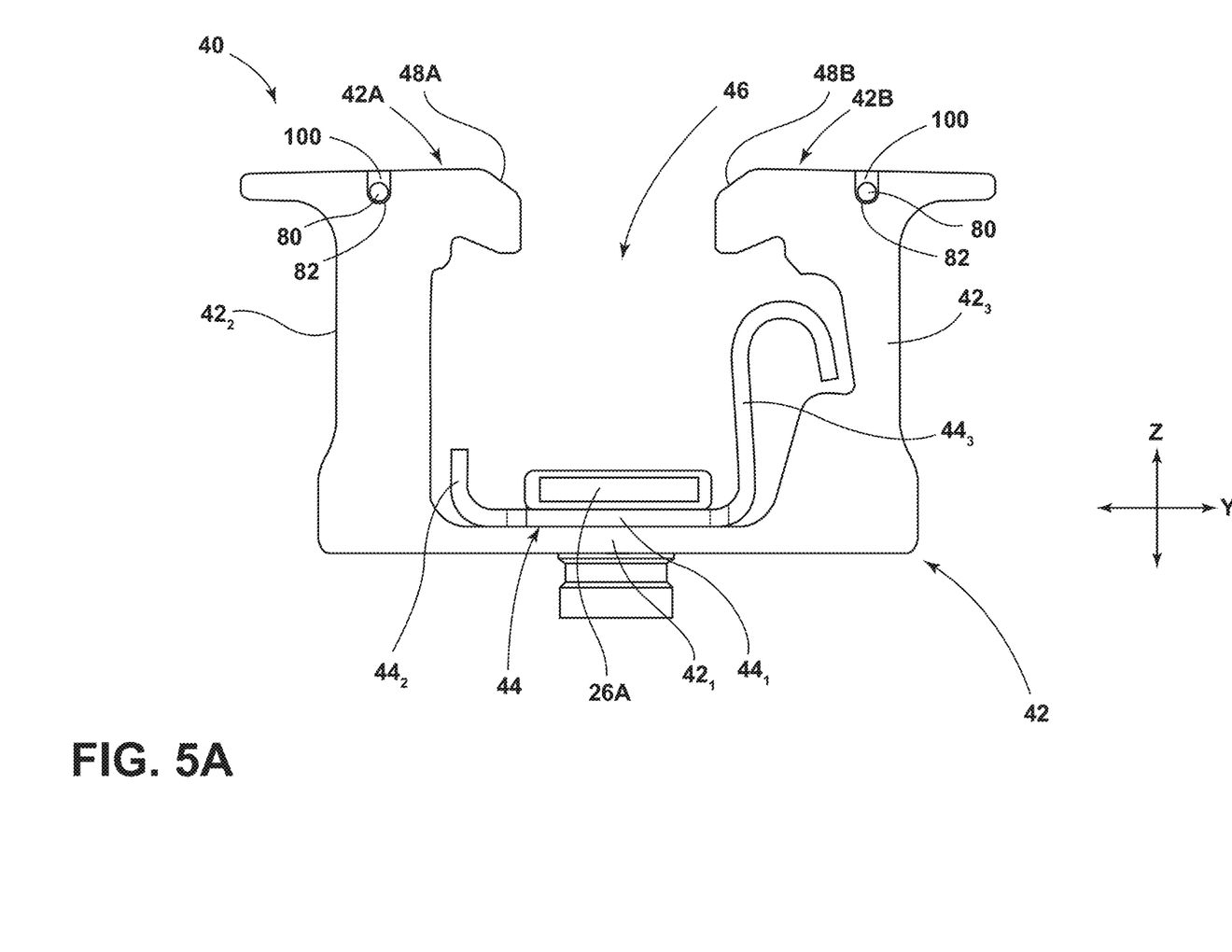
FIG. 5A is a cross-sectional view generally illustrating an embodiment of a track assembly according to teachings of the present disclosure.
Figure 5B:
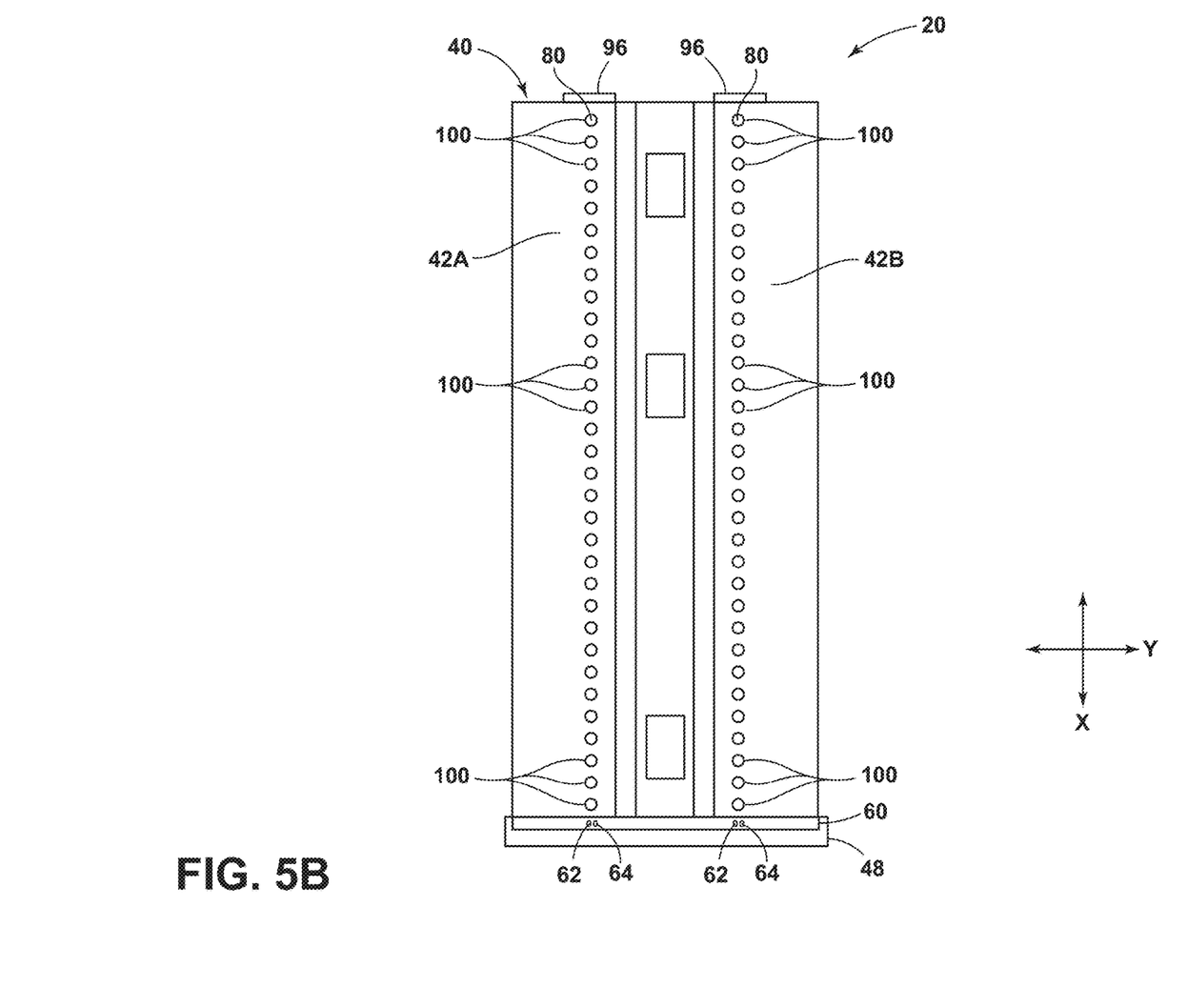
FIG. 5B is a top view generally illustrating an embodiment of a track assembly according to teachings of the present disclosure.
Figure 6A:
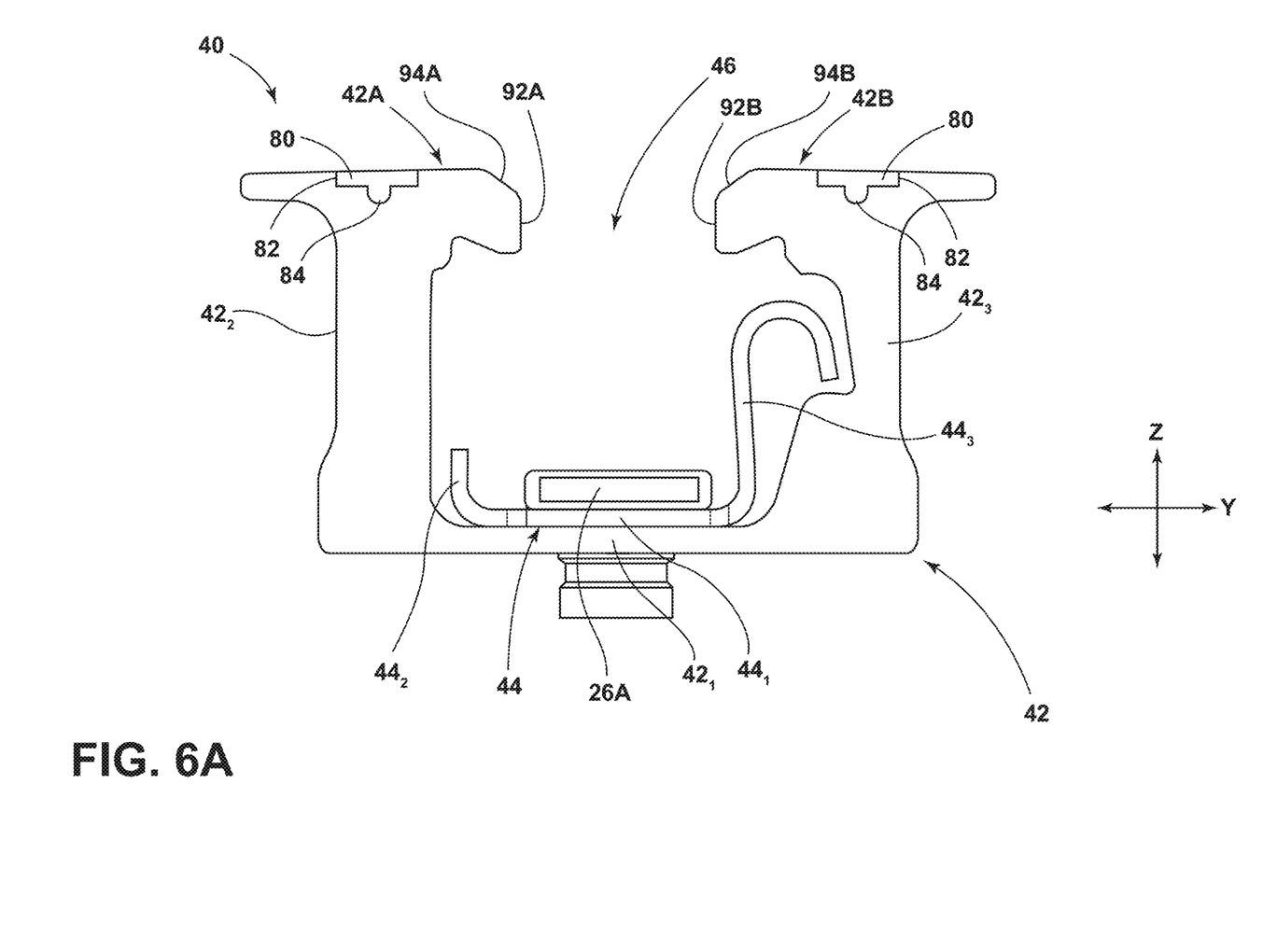
FIG. 6A is a cross-sectional view generally illustrating an embodiment of a track assembly according to teachings of the present disclosure.
Figure 6B:
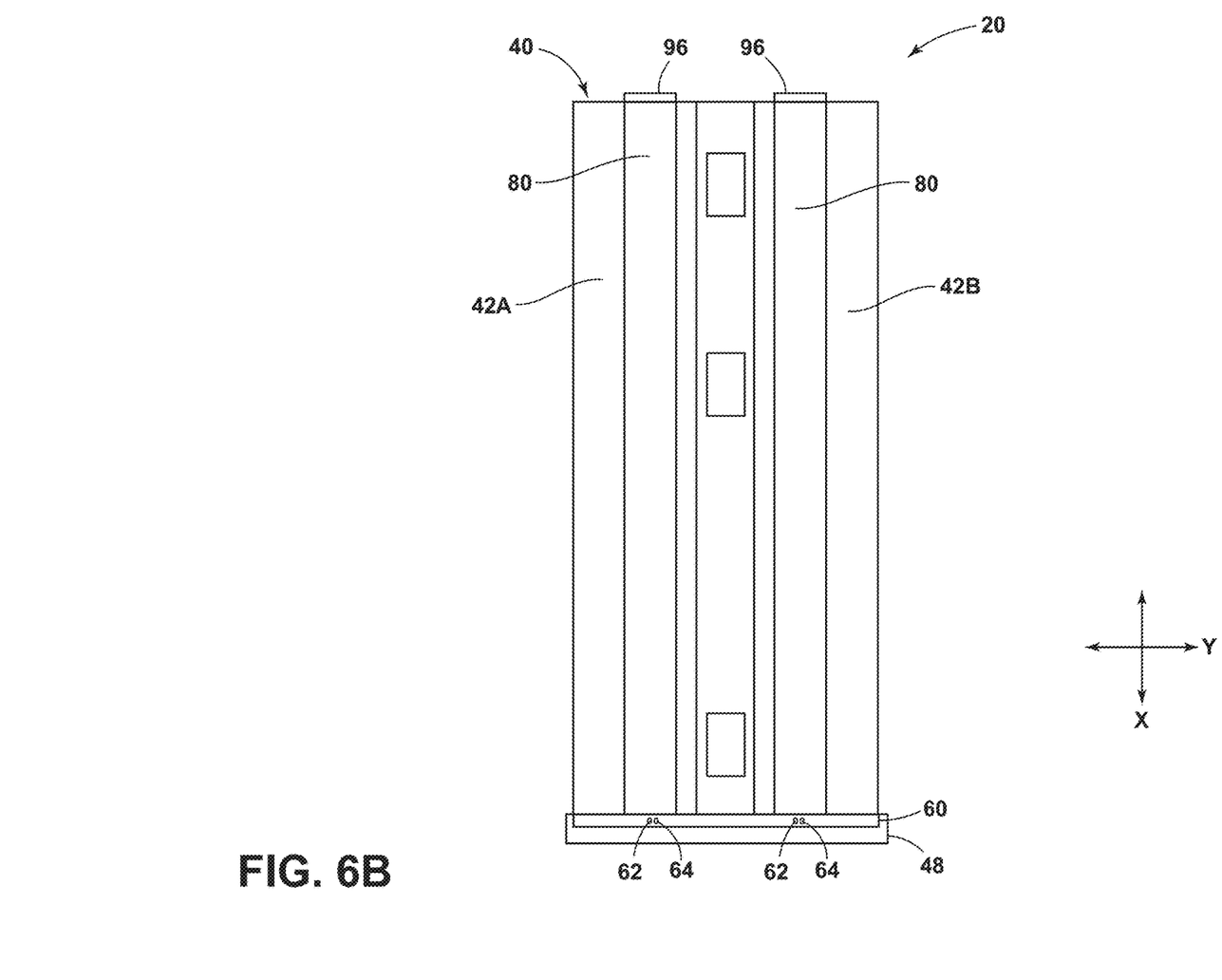
FIG. 6B is a top view generally illustrating an embodiment of a track assembly according to teachings of the present disclosure.

With embodiments, a transmitter unit 60 may be disposed at and/or connected to a first end of a track 40 and a reflecting element 96 may be disposed at a second/opposite end of the track 40 (see, e.g., FIGS. 5B and 6B). The transmitter unit 60 may provide light to a first end of a light guide 80 and the reflecting element 96 may be configured to reflect the light when the light reaches the second end of the light guide 80. Additionally or alternatively, the transmitter unit 60 (and/or a second transmitter unit) may be connected to both ends of the track 40/light guide 80. In embodiments, the transmitter unit 60 may be disposed at least partially in (e.g., hidden in) a cap 48 of the track 40.

With embodiments, the transmitter unit 60 may be configured to transmit one or more of a variety of colored light from the visible light source 62. The first ECU 50A may control the visible light transmitted from the transmitter unit 60 and/or the visible light source 62, such as for aesthetic purposes and/or to provide a status indictor to a user. For example and without limitation, the transmitter unit 60 may transmit a green light to indicate to a user that the seat 24 is properly connected to the first track 42 and/or the second track 44. The transmitter unit 60 may transmit a red light to indicate to a user that the seat 24 is not properly connected to the first track 42 and/or the second track 44. The transmitter unit 60 may transmit a red light to indicate that one or more safety devices 52, 54 may not be in an operable condition. Status indicators may correspond to one or more other statuses. For example and without limitation, a status may include that a vehicle has arrived at a destination, that there is an incoming phone/video/audio call, that data has been received, that one or more components/systems of a vehicle are malfunctioning, and/or that the vehicle is low on fuel/power, among others.

With embodiments, the transmitter unit 60 may be configured to transmit visible light for aesthetics, to illuminate/improve visibility proximate the track 40 for a user, and/or to provide a status indicator to a user. Additionally or alternatively, the transmitter unit 60 may be configured to transmit non-visible light to communicate with the receiver unit 70, such as to communicate with the second ECU 50B and/or to activate one or more safety devices 52, 54.

With embodiments, such as generally illustrated in FIG. 3, a light guide 80 may be disposed at least partially in the second track 44 and/or between the second wall $44_2$ and the third wall $44_3$. The light guide 80 and/or the channel 82 may include a width substantially similar to the width of the first wall $44_1$. The light guide 80 may be disposed above the first wall $44_1$. With embodiments, a reflecting element 90 may be disposed proximate the bottom of the light guide 80 and may be configured to reflect light toward and/or into the gap 46 of the first track 42.

In embodiments, such as generally illustrated in FIG. 4, the light guide 80 may be disposed in a channel 82 of the first track 42 and/or the second track 44. The channel 82 may, for example and without limitation, be formed in a wall of the first track 42, such as in the second wall $42_2$. The light guide 80 may be disposed at least partially in the channel 82 and/or the second wall $42_2$. The light guide 80 may facilitate transmission of light from the transmitter unit 60 along some or all of the length of the first track 42. At least some light may be transmitted in the Y-direction and/or the Z-direction. The light guide 80 and/or the channel 82 may, for example and without limitation, be substantially rectangular shaped.

In embodiments, such as generally illustrated in FIGS. 5A and 5B, a light guide 80 and/or a channel 82 may be disposed substantially in the first portion 42A and/or the second portion 42B of the first track 42. For example and without limitation, a first light guide 80 may be disposed in a first channel 82 that is disposed in the first portion 42A; and a second light guide 80 may be disposed in a second channel 82 that is disposed in the second portion 42B. The light guide 80 and/or the channel 82 may be disposed in a top portion of the first portion 42A and/or the second portion 42B (e.g., a top surface of the first track 42). The light guide 80 and/or the channel 82 may include one or more of a variety of shapes, sizes, and/or configurations. For example the light guide 80 and/or the channel 82 may be substantially circular/cylindrical (see, e.g., FIG. 5A).

With embodiments, such as generally illustrated in FIG. 5B, the first portion 42A and/or the second portion 42B of the first track 42 may include one or more apertures 100. The apertures 100 may be disposed along the track 40 substantially in the X-direction and/or may extend substantially in the Z-direction. The light guide 80 may be disposed within a channel 82 of the first portion 42A and/or the second portion 42B. The light guide 80 may be disposed below the top surface of the first portion 42A and/or the second portion 42B. The apertures 100 of the first portion 42A and/or the second portion 42B may be connected to the channel(s) 82 and may facilitate the projection of light (e.g., visible light) from the light guide 80 through the first portion 42A and/or the second portion 42B. Portions of the light guide 80 may not be exposed (e.g., may be covered by the first portion 42A and/or the second portion 42B) such as to increase robustness of the light guide 80.

In embodiments, such as generally illustrated in FIGS. 6A and 6B, the light guide 80 may not be covered by the first portion 42A and/or the second portion 42B and substantially the entire top surface of the light guide 80 may be visible. The light guide 80 may be substantially rectangular and/or may include a protrusion 84 that may extend in the Z-direction (see, e.g., FIG. 6A), which may provide the light guide 80 with a generally T-shaped configuration. The channel 82 may include a corresponding shape such that the light guide 80 may be substantially received by the channel 82.

Figure 7:
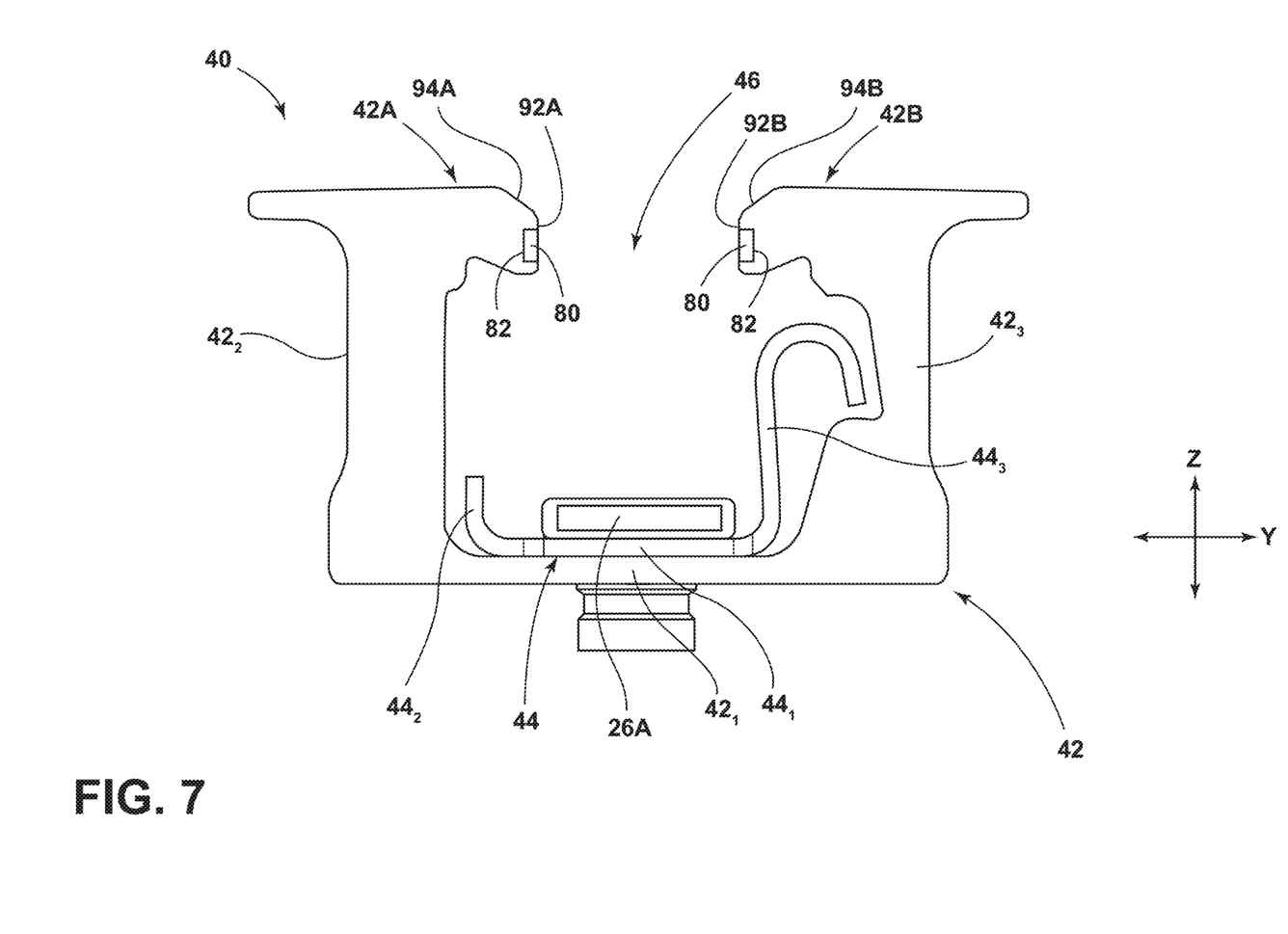
FIG. 7 is a cross-sectional view generally illustrating an embodiment of a track assembly according to teachings of the present disclosure.

With embodiments, such as generally illustrated in FIG. 7, the first portion 42A and/or the second portion 42B may include an inner portion 92A, 92B. The inner portions 92A, 92B may be substantially planar and/or vertical. The inner portions 92A, 92B may be disposed opposite from each other and/or may be aligned with each other. A light guide 80 and/or a channel 82 may be disposed substantially in the inner portion 92A and/or the inner portion 92B (e.g., a first light guide 80 and a first channel 82 may be disposed in the inner portion 92A and a second light guide 80 and a second channel 82 in the inner portion 92B). The light guide 80 and/or the channel 82 may be substantially rectangular and/or circular. The light guide 80 may project light toward and/or into the gap 46 from the inner portions 92A, 92B of the first portion 42A and/or the second portion 42B.

Figure 8:
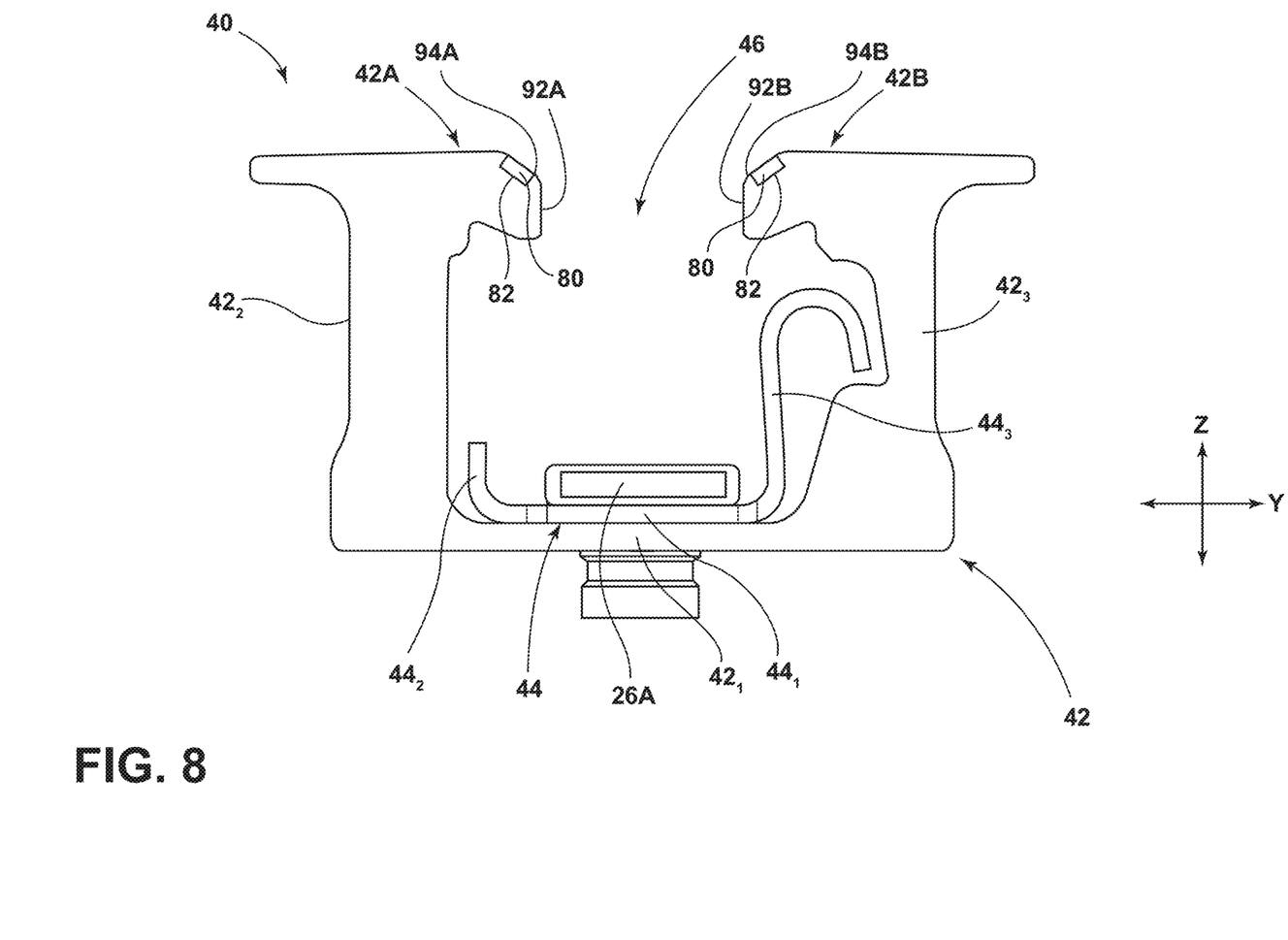
FIG. 8 is a cross-sectional view generally illustrating an embodiment of a track assembly according to teachings of the present disclosure.

In embodiments, such as generally illustrated in FIG. 8, the first portion 42A and/or the second portion 42B may include a first ramped portion 94A and/or a second ramped portion 94B, respectively. A light guide 80 and/or a channel 82 may be disposed in the first ramped portion 94A and/or the second ramped portion 94B (e.g., a first light guide 80 and a first channel 82 may be disposed in the first ramped portion 94A and a second light guide 80 and a second channel 82 in the second ramped portion 94B). The light guide 80 and/or the channel 82 may be substantially rectangular and/or circular. The light guide 80 may project light at an angle toward and/or out of the gap 46 of the first track 42. For example and without limitation, the angle may be between 0 degrees and about 90 degrees, such as about 45 degrees.

With embodiments, a method of operating a track assembly 20 may include providing a seat 24, a first track 42, a second track 44, a first ECU 50A, a second ECU 50B, a transmitter unit 60, and/or a receiver unit 70. The method may include the controlling the transmitter unit 60 via the first ECU 50A. The first ECU 50A may control the transmitter unit 60 to project visible and/or non-visible light via a visible light source 62 and/or a non-visible light source 64. The method may include projecting visible light and/or non-visible into and/or through a light guide 80 disposed in the first track 42. The method may include the receiver unit 70 receiving information from the transmitted light via a first sensor 72 (e.g., a visible light sensor) and/or a second sensor 74 (e.g., a non-visible light sensor) of the receiver unit 70. The method may include the second ECU 50B receiving information via the receiver unit 70. The method may include providing a first safety device 52 and/or a second safety device 54. The method may include the first ECU 50A activating the first safety device 52 and/or the second safety device 54 by transmitting information (e.g., a trigger) via the transmitter unit 60 and the receiver unit 70 receiving the information.

In embodiments, the transmitter unit 60 may be configured to transmit light that may be received by a portable electronic device 110, such as a smartphone of a user (see, e.g., FIG. 2). The portable electronic device 110 of the user may include a receiver unit 70' and/or may be configured to provide a notification (e.g., text, audible warning, etc.) to the user that corresponds to the light transmitted by the transmitter unit 60.

In embodiments, an ECU (e.g., ECUs 50A, 50B) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touch-screen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A track assembly, comprising:
    a track configured to be fixed to a mounting surface;
    a support member configured for connection with and movement along the track;
    a transmitter unit configured to provide light to one or both of the track and the support member;
    a receiver unit connected to move with the support member relative to the track and configured to receive light from the transmitter unit; and
    a light guide connected to the track;
    wherein the track includes bottom side, a second side, and a third side; and the light guide is disposed at least partially in the second side.

2. The track assembly of claim 1, wherein the transmitter unit is configured to transmit visible light for aesthetics; and the transmitter unit is configured to transmit non-visible light to communicate with the receiver unit.

3. The track assembly of claim 2, including a first electronic control unit connected to the transmitter unit;
    wherein the first electronic control unit is configured to control the transmitter unit; the transmitter unit includes a light source;
    the receiver unit includes a sensor; and
    the transmitter unit is configured to transmit light from the light source into the track, along the track, or into and along the track.

4. The track assembly of claim 2, wherein the transmitter unit is configured to transmit visible light and non-visible light.

5. The track assembly of claim 2, including a first electronic control unit connected to the transmitter unit, and a second electronic control unit connected to the receiver unit;
    wherein the first electronic control unit is configured to transmit information to the second electronic control unit via non-visible light transmitted by the transmitter unit and received by the receiver unit.

6. The track assembly of claim 1, wherein the light guide is connected to the transmitter unit and configured to guide light from the transmitter unit along the track.

7. The track assembly of claim 1, wherein the light guide extends along substantially an entire length of the track.

8. The track assembly of claim 1, including a reflecting element connected to the track.

9. The track assembly of claim 8, wherein the reflecting element is configured to reflect light from the transmitter unit.

10. The track assembly of claim 8, wherein the reflecting element is disposed at least partially in the light guide.

11. The track assembly of claim 1, wherein the second side and the third side extend in a longitudinal direction of the track;
    the second side includes a first portion;
    the third side includes a second portion;

the first portion and the second portion extend in a lateral direction of the track from the second side and the third side; and the light guide disposed in the first portion.

12. The track assembly of claim 1, wherein the light guide is substantially cylindrical and is disposed in a channel in a top surface of the track.

13. The track assembly of claim 12, wherein the track includes a plurality of apertures connected to the channel and disposed substantially perpendicular to the channel.

14. The track assembly of claim 1, including a second light guide connected to the track;

wherein the track includes bottom wall, a second wall, and a third wall;

the light guide is disposed at least partially in the second wall; and the second light guide is disposed at least partially in the third wall.

15. The track assembly of claim 14, wherein the light guide is connected to a ramped portion of the track.

16. The track assembly of claim 14, wherein the light guide and the second light guide are disposed opposite from each other.

17. A track assembly, comprising:

a track configured to be fixed to a mounting surface;

a support member configured for connection with and movement along the track;

a transmitter unit configured to provide light to one or both of the track and the support member; and a receiver unit connected to move with the support member relative to the track and configured to receive light from the transmitter unit;

wherein the transmitter unit is configured to transmit visible light for aesthetics and to provide a status indicator to a user; and the transmitter unit is configured to transmit non-visible light to communicate with the receiver unit.

18. A track assembly, comprising:

a track configured to be fixed to a mounting surface;

a support member configured for connection with and movement along the track; and a transmitter unit configured to provide light to one or both of the track and the support member;

wherein the transmitter unit is configured to transmit light to a portable electronic device having a receiver unit.

19. The track assembly of claim 18, including a light guide connected to the track.

20. The track assembly of claim 18, including a light guide connected to the track; wherein the track includes bottom side, a second side, and a third side; and the light guide is disposed at least partially in the second side.

* * * * *